US012767816B2

(12) United States Patent
Pärssinen et al.

(10) Patent No.: US 12,767,816 B2
(45) Date of Patent: Oct. 20, 2026

(54) FLEXIBLE WOOD COMPOSITE MATERIAL

(71) Applicant: Sulapac Oy, Helsinki (FI)

(72) Inventors: Antti Pärssinen, Helsinki (FI); Katja Heinonen, Helsinki (FI); Joona Kontinen, Helsinki (FI); Antti Valtonen, Helsinki (FI)

(73) Assignee: SULAPAC OY, Helsinki (FI)

( * ) Notice: Subject to any disclaimer, the term of this patent is extended or adjusted under 35 U.S.C. 154(b) by 676 days.

(21) Appl. No.: 17/631,553

(22) PCT Filed: Jul. 29, 2020

(86) PCT No.: PCT/FI2020/050509

§ 371 (c)(1),
(2) Date: Jan. 31, 2022

(87) PCT Pub. No.: WO2021/019130

PCT Pub. Date: Feb. 4, 2021

(65) Prior Publication Data

US 2022/0275202 A1 Sep. 1, 2022

(30) Foreign Application Priority Data

Jul. 29, 2019 (FI) ...................................... 20195654

(51) Int. Cl.
*C08L 67/04* (2006.01)

(52) U.S. Cl.
CPC ......... *C08L 67/04* (2013.01); *C08L 2205/035* (2013.01)

(58) Field of Classification Search
CPC ........... C08L 67/04; C08L 91/06; C08L 97/02
See application file for complete search history.

(56) References Cited

U.S. PATENT DOCUMENTS

2002/0119904 A1* 8/2002 Boskamp ........... C11D 17/0073 510/462
2009/0018235 A1* 1/2009 Nascimento ............ C08L 67/04 524/400

(Continued)

FOREIGN PATENT DOCUMENTS

CN 106147158 A * 11/2016
CN 107868285 A 4/2018

(Continued)

OTHER PUBLICATIONS

Clemons et al. Functional Fillers for Plastics, Chapter 15, p. 251, (2005) (Year: 2005).*

(Continued)

*Primary Examiner* — Catherine S Branch
*Assistant Examiner* — Olga Lucia Donahue
(74) *Attorney, Agent, or Firm* — Timothy H. Van Dyke; Wolter Van Dyke Davis, PLLC

(57) ABSTRACT

A composite material, methods of producing it and articles manufactured therefrom. The composite material comprises a first component formed by a renewable polymer and a second component formed by a reinforcing material. The first component comprises a thermoplastic polymer selected from the group of biodegradable polyesters and mixtures thereof, and the second component comprises particles of a hydrophilic material, having a sieved size of less than 0.5 mm. The composite material further comprising regions of elasticity to provide for compostable objects and articles having properties of flexibility or semi-rigidity in at least one dimension. The flexible composite material can be used in thin-walled extruded articles, exhibiting increased flexibility or softness in transversal direction.

20 Claims, 8 Drawing Sheets

(56) References Cited

U.S. PATENT DOCUMENTS

| | | | | |
|---|---|---|---|---|
| 2016/0108243 | A1* | 4/2016 | Deaner | B29C 48/80 264/211 |
| 2016/0242965 | A1 | 8/2016 | Pärssinen | |
| 2016/0250063 | A1 | 9/2016 | Pärssinen | |

FOREIGN PATENT DOCUMENTS

| | | | |
|---|---|---|---|
| CN | 108530854 | A | 9/2018 |
| CN | 108677270 | A | 10/2018 |
| CN | 108677271 | A | 10/2018 |
| CN | 109593332 | A | 4/2019 |
| CN | 109618739 | A | 4/2019 |
| CN | 106750486 | B | 5/2019 |
| JP | 0873714 | A | 3/1996 |
| JP | 10330625 | A | 12/1998 |
| JP | 3219893 | U | 1/2019 |
| KR | 20190062906 | A | 6/2019 |

OTHER PUBLICATIONS

Shaikh et al, Current Research in Food Science 4 (2021) (Year: 2021).*

Ferreira et al. Polymer Engineering & Science vol. 59, Issue s2: Applied Polymers, 2017 (p. 2) https://4spepublications.onlinelibrary.wiley.com/doi/epdf/10.1002/pen.24770 (Year: 2017).*

Petinakis et al. Polymer Degradation and Stability 95 (2010)1704-1707 (Year: 2010).*

Gardner et al. Extrusion of Wood Plastic Composites, 2010, (Year: 2010).*

English Machine Translation of CN106147158 (A) obtained on Nov. 7, 2025 from https://worldwide.espacenet.com/publicationDetails/biblio?DB=EPODOC&II=0&ND=3&adjacent=true&locale=en_EP&FT=D&date=20161123&CC=CN&NR=106147158A&KC=A(Year: 2016).*

Chaiwutthinan et al: Composites of poly(lactic acid)/poly(butylene adipate-co-terephthalate) blend with wood fiber and wollastonite: Physical properties, morphology, and biodegradability. Journal of Applied Polymer Science, Jun. 5, 2019, vol. 136, No. 21, p. 136.

Dou et al: Investigation on Polylactide (PLA)/ Poly(butylene adipate-co-terephthalate) (PBAT)/ Bark Flour of Plane Tree (PF) Eco-Composites. Materials, MDPI (Online), May 19, 2016, vol. 9, No. 393, pp. 1-14.

Georgipoulos et al: The effect of wood-fiber type on the thermomechanical performance of a biodegradable polymer matrix. Journal of Applied Polymer Science, Apr. 1, 2015, vol. 132, No. 27, pp. 1-10.

Hongsriphan et al: Influence of fabrication conditions on properties of PLA/PBAT wood composte strand. The 19th International Conference on Composite Materials, Jan. 1, 2013.

Sis et al: Effect of (3-aminopropyl)trimethoxysilane on mechanical properties of PLA/PBAT blend reinforced kenaf fiber. Iran Polymer Journal, Dec. 15, 2012, vol. 22, pp. 101-108.

Sykacek et al: Compatibility of Softwood Flour and Commercial Biopolymers in Injection Molding. Polymer Composites, Apr. 7, 2009, vol. 31, No. 3, pp. 443-451.

Sykacek et al: Extrusion of five biopolymers reinforced with increasing wood flour concentration on a production machine, injection moulding and mechanical performance. Composites: Part A, Jun. 2, 2009, vol. 40, No. 8, pp. 1272-1282.

Korean Notice to file a Response report dated Jun. 23, 2025, 9 pages.

* cited by examiner

FLEXIBLE WOOD COMPOSITE MATERIAL

TECHNICAL FIELD

The present invention relates to composite materials which are capable of being shaped into three-dimensional objects and articles. Materials of the present kind comprise a first component formed by a renewable polymer and a second component formed by a reinforcing material.

In particular the present invention concerns materials in which the first component comprises a thermoplastic polymer selected from the group of biodegradable polyesters and mixtures thereof, and a second component which comprises particles of a hydrophilic material. The invention also concerns articles manufactured from the composite materials as well as methods of manufacturing the composite materials.

BACKGROUND ART

It is the growing awareness of environmental issues and scarcity of resources which has increased the interest surrounding the use of bio-based materials in a large number of applications. On legislative level, the more stringent policies have forced many industries to seek or develop new materials from renewable sources to take place of the traditional materials derived from non-renewable fossil resources.

One of the most prominent challenges during the recent decades has been the accumulation of plastics in the environment, especially in the oceans. This is mostly due to the poor waste treatment processes, which results in the leakage of the debris from the waste treatment facilities to the environment. The plastic debris in the oceans poses a considerable threat to marine animals, which could eventually result in catastrophic events in the marine ecosystems. In October 2018, European Parliament approved a ban on plastic cutlery and plates, cotton buds, straws, drink-stirrers and balloon sticks. At the time of the decision, the EU hoped that the ban will go into effect across the bloc by 2021. Other items with no other existing material alternatives (such as burger boxes and sandwich wrappers) will still have to be reduced by 25% in each country by 2025. Another target is to ensure that 90% of all plastic drink bottles are collected for recycling by 2025. It is therefore evident that there is an urgent need for more efficient waste treatment processes. On the other hand, this problem could be at least partially solved by developing materials that degrade fast when winded up in the nature.

To eliminate the environmental problems associated with petroleum based, non-biodegradable and single-use plastics, an extensive amount of research has been conducted to develop biodegradable polymers with similar characteristics when compared with non-degradable counterparts. This has led to the development of a large number of polymers, such as polylactic acid (PLA), polycaprolactone (PCL), polyhydroxybutyrate (PHB), polybutylene adipate terephthalate (PBAT), polybutylene succinate (PBS), polyhydroxyalkanoates (PHA) and blends of them. Despite their advantageous properties especially in terms of biodegradability, they degrade slowly when exposed to environmental conditions. Most of the commercially available biopolymers possess certificate only for industrial composting which is carried out at elevated −60° C. temperature and even then, for thicknesses of less than 1.5 mm. As a result of this only thin-walled products, such as carrier bags or films, are made from these materials.

PLA is an example of a biodegradable synthetic thermoplastic polyester derived from renewable resources, such as sugar from sugarcane and maize and other plants, and is currently one of the most commonly used bioplastics. PLA is also quite durable and rigid, and it possesses good processing properties for most applications. PLA does not degrade fast in low temperature and humidity, but when exposed to high humidity and elevated temperatures (≥60° C.), it will be rapidly decomposed. The biodegradation of PLA is a two stage process consisting of hydrolysis to low molecular weight oligomers, followed by complete digestion by microorganisms. The applications of PLA range from food sector to biomedicine but are limited due to the high price of the polymer and low degradation speed in the nature.

Several studies have shown that even though the wall thickness of products made from biodegradable polymers, such as PLA, is kept at around 1 mm, their marine biodegradation may still take an excess amount of time (i.e., years) and therefore their marine biodegradability could be considered dubious. The slow degradation is strongly related to poor water absorption properties of pure PLA.

The development of biodegradable and compostable materials has been focusing on renewable sources, such as bio-based and biodegradable polymers and natural fibers from forest industry residues and by-products from, e.g., coffee, cosmetic and grain-based ethanol industries. Additionally, fibers from agriculture (such as wheat straw) and lignin containing materials such as hemp stalks can be utilized as fillers.

For some utensil applications e.g. straw it is required that it is flexible or elastic. This is the case especially when child safety is concerned. The known PLA based thermoplastic composite materials are rigid, and they do brake forming sharp edges and peace.

There is a need for materials which, while exhibiting the advantageous properties of thermoplastic/wood particle based composites, also have sufficient flexibility for use in e.g. straws.

Compositions of a compostable polymer, PLA, and micro-ground cellulosic material are disclosed in WO 2015/048589. The publication describes an annealed PLA composite containing PLA and up to 30% of micro-ground cellulosic material, such as micro-ground paper of paper pulp. The particle size of the micro-ground is 10 to 250 μm, in particular 20 to 50 μm, with a narrow size distribution. According to the publication, the material is compostable and exhibits a high heat deflection temperature (HDT). However, it appears that no mechanical benefits are gained by the addition of the micro-ground material, and the maximum loading of the material was limited to 30% to avoid problems during processing and injection molding.

More composite materials are described in CN 101712804 A, US2013253112, US2016076014, US2002130439 and EP 0 319 589.

The wood used in WPCs is ground, screened and dried prior extrusion. For decking and fence profiles, where a rough surface texture is acceptable or even desirable, screening the wood fiber to 40-60 mesh results in good flow characteristics and ease of mixing into the polymer matrix. For profiles requiring a smooth finish, the wood is sieved through 80 to 100 mesh screens. Fines that pass through a 120 mesh screen are not desirable due to poor flow properties and heterogeneous distribution in the polymer matrix during extrusion.

Heterogeneously distributed wood fibers, so called "wood spots", are a common quality problem especially when wood contains excessive fines or when the extruders is too worn to achieve a homogeneous mixture (CN 107932874A).

For example, JP4699568B2 concerns a method of manufacturing a thin-walled container having a thickness in a range of 0.3 to 0.7 mm. The polymer used in this invention is PLA with a further possibility to include inorganic fillers (1-28 wt %) in the material. This invention, therefore, does not apply to materials containing natural fibers in combination with PLA. As will be shown in the following sections, the production of thin-walled products solely from biodegradable polymers leads into thermal deformation when exposed to elevated temperatures (e.g., over 50° C.).

In U.S. Pat. No. 10,071,528B2, an invention regarding stiffened thin-walled fiber composite products and method of making the same has been introduced. The product in this invention consists of layers having different types of fibers, including natural fibers, as reinforcements. The final structure has a thickness between 0.5 mm and 3 mm. The invention in this patent concerns only hollow and cylinder structures and it does not include biodegradable polymers as the matrix material.

CN101429328A presents an invention of material that can be used for producing natural degradable deep-cavity thin-wall soft bottle for tableware and soft bottle thereof. The material presented in this invention consists of the following components in weight percentage: 85-90 wt % of PLA, 9-14 wt % of polyethylene terephthalate (PET), and the rest of the material consists of PET additives. The thickness of the bottle is 0.07-0.09 mm. Even though the authors state that the material is biodegradable, the inclusion of PET in the material, known not to be biodegradable, leaves small-sized plastics remnants behind. In addition, the inclusion of natural fibers in the material is not covered in this invention.

A material invention for biodegradable or compostable containers is presented in US20030216492A1 (expired). The material presented in the invention is based on starch obtained from, e.g., potato, paper or corn. Furthermore, the properties of the material are modified through addition of wood flour or fibers (aspect ratio between 1:2 and 1:8) to the starch suspension. The addition of wood fibers makes the material moldable. The molded article is made waterproof by applying a liquid-resistant coating (e.g., PROTECoat, Zein®) to the product. These products can be used as cups, trays, bowls, utensils or plates. The thickness of the articles can range between 0.001 mm and 10 mm. The invention applies only to starch-based formulations and it is not applicable to extrusion applications. Even though injection molding is presented as one possible conversion technology, the formulas for creating injection molded articles include only less than 10 wt % of wood. Furthermore, a coating is needed in order to make this material suitable for its applications. Other starch-based materials for thin-walled applications are described in U.S. Pat. No. 6,168,857B1 (sheet having a thickness less than about 1 cm).

Based on the facts presented above, there is still a need for biodegradable materials which have accelerated degradation rate in environmental conditions and can be effectively produced with mass production machinery.

SUMMARY OF INVENTION

It is an aim of the present invention to eliminate at least a part of the disadvantages of the prior art and to provide a new flexible wood composite material suitable for extrusion processes.

The present invention is based on the concept of providing composite materials by combining a first component formed by a rigid thermoplastic biopolymer, a second component formed by a reinforcing material, and a third component which exhibits properties of flexibility or elasticity. The composite materials thus obtained can be used for producing articles with regions of elasticity. Such articles exhibit properties of flexibility or semi-rigidity in at least one dimension. The reinforcing material comprises fibers or particles, which are for example formed from non-fibrillated wood particles, having a sieved size equal to or less than 0.5 mm.

Further on, the produced material has coarse surface for accelerated biodegradation.

Compositions of the indicated kind can be produced by incorporating into the composite materials a third component formed by an elastic or soft thermoplastic biopolymer. In particular, the third component is selected from biopolymeric materials. Such materials are represented by polybutyrate adipate terephthalate (PBAT) and polybutylene succinate PBS Such a polymer, in particular biopolymer, can be evenly or homogeneously distributed within the polymer of the first component.

The novel materials can be extruded into sheets or tubes or other three-dimensional products or objects which are flexible or elastic.

More specifically, the present invention is mainly characterized by what is stated in the characterizing part of the independent claims.

Considerable advantages are obtained by the invention.

Thus, the present materials will achieve excellent properties of compostability in combination with good mechanical properties. Water absorption of a straw comprising thermoplastic, biodegradable materials and wood flour, as disclosed herein, is more than 1 wt % within a 4 month immersion in water with straws weighting between 2 and 4 grams having wall thicknesses between 0.1 mm and 1 mm and diameter between 5 mm to 15 mm and densities between 1 and 1.5 g/$cm^3$.

In preferred embodiments, the produced material has coarse surface which provides for accelerated biodegradation. Moreover, the material degrades faster in mesophilic conditions when compared with the typical biodegradable polymers, such as PLA and PBAT.

The products, for which this material is particularly suitable, have a wall thickness equal or less than about 1.0 mm, in particular equal to or less than 0.5 mm. This makes them well suited for drinking straws and thin sheets.

In one embodiment, the present invention provides a sheet having a thin wall formed by compostable material comprising in combination an elastic biodegradable polymer, which forms a continuous matrix and, mixed therein, particles of a hydrophilic material capable of swelling inside the matrix upon water absorption.

Alternatively, compostable material comprising a combination of biodegradable polymers having different elongation properties which forms two separate continuous matrixes and particles of a hydrophilic material capable of swelling inside the matrix upon water absorption.

In the following, the invention will be more closely examined with a detailed description and referring to the drawings attached.

BRIEF DESCRIPTION OF DRAWINGS

FIG. 14 shows a DMTA graph from oscillation measurement of deformable composite material; and.

DESCRIPTION OF EMBODIMENTS

Figure 1:
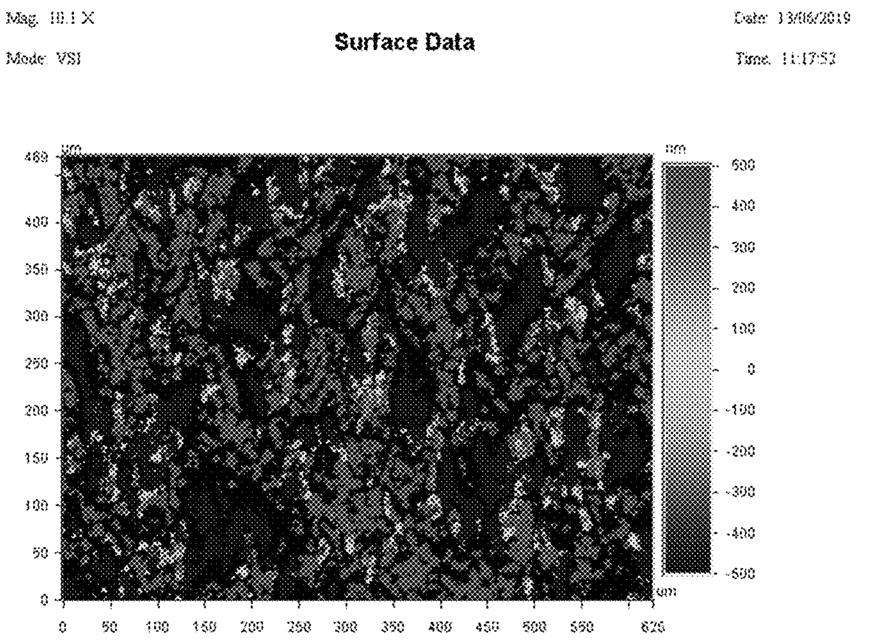
FIG. 1 shows example surface data from a sample containing 0% wood.

In the present context, the term "three-dimensional objects" refers to objects having a width, a length and a height. Typically, the term covers objects which are shaped as sheets, plates, boards, panels, tube, pipes, or profiles. In the present objects, each dimension is preferably greater than 0.1 mm.

The term "thin-walled" product stands for products having a wall thickness equal or less than about 1.0 mm, in particular equal to or less than 0.5 mm and equal to or more than 0.2 mm.

In some embodiments, thin-walled products have a wall thickness of, typically, about 0.3 to about 0.5 mm.

"Rigid" when used in the context of a polymer means that the polymer, either a thermoplastic or thermosetting polymer, has elongation at break of less than or equal to 10% according to ISO 527.

"Elastic" is a polymer which has elongation at break of more than 100% according to ISO 527.

"Coarse" stands for a surface which has a surface roughness (Ra) of more than 1 μm, as determined according to ISO 4287.

The term "screened" size is used for designating particles which are sized or segregated or which can be sized or segregated into the specific size using a screen having a mesh size corresponding to the screened size of the particles.

Migration tests carried out in compliance with regulation (EU) No. 10/2011 are carried out for example pursuant to EN1186-3:2002 standard, describing the testing procedure for overall migration testing, or EN13130 standard, describing the general testing procedure for specific migration testing including analytical measurements.

The present technology is based on the combination of natural hydrophilic particles, in particular biomass particles with a biodegradable polymer mixture to form a composition. Suitable raw materials are represented by lignocellulosic materials, such as annual or perennial plants or wooden materials and other crops and plants as well as materials derived from such materials, such as pulp and fibers. In one embodiment, particles or fibers of wood or other lignocellulosic materials, for example chips or other coarse wood particles, are combined with a biodegradable polymer mixture to form a composition.

In the herein described materials, water absorption through the structure is primarily attained by incorporation of hydrophilic particles, for example finely divided wood particles, such as saw-dust, or large wood particles, such as chips, which enable disintegration of the composite material. Properties of elasticity are attained by incorporation of a second polymeric, elastic component. The present composite materials, having a combination of biodegradability and flexibility, are suitable for processing by, for example, melt processing.

In one embodiment, the present composite material comprises a first component formed by a polymer and a second component formed by a reinforcing material. The first component comprises typically a thermoplastic polymer selected from the group of biodegradable polyesters and mixtures thereof. The second component comprises particles of a biomass material, such as wood particles, having a sieved size of 0-0.5 mm.

In one embodiment, the biodegradable polyester is a renewable plant-based material that can be replenished within a period of 10 years or less, for example 1 month up to 5 years.

According to an aspect, the first component forms the matrix of the composite, whereas the microstructure of the second component in the composition is discontinuous. The particles of the second component can have random orientation or they can be arranged in a desired orientation. The desired orientation may be a predetermined orientation.

Further, the present invention concerns articles the production of flexible composite materials for use in thin-walled extruded biodegradable applications. The invention also concerns materials and products.

As will be discussed in more detail below, in particularly preferred embodiments, wherein the present composite material is shaped into a generally elongated, planar or tubular object exhibiting increased flexibility or softness in transversal direction, i.e. perpendicular to the longitudinal axis of the plane. In directions different from the thickness of the material, the articles produced typically exhibit smallest dimensions of at least 5 mm up to 10,000 mm, in particular 10 mm to 1000 mm.

In one embodiment, the composite material exhibits-when shaped into a tubular object having a weight of 1.2 g and having an outer surface of 34 $cm^2$—a water absorption of 0.01 $mg/cm^2$ per day and more than 0.1 $mg/cm^2$ within a 30 day period of time at NTP.

In one embodiment, the ratio of thermoplastic polymer to natural fiber particles (e.g., wood) by weight is 35:65 to 99:1. In another embodiment, the composite comprises 1 to 60%, in particular 10 to 30% by weight of natural fiber particles from the total weight of the thermoplastic polymer and the natural fiber particles.

According to a preferred embodiment, a polylactide polymer (in the following also abbreviated "PLA") is used as a thermoplastic polymer in the first component of the composition. The polymer may be a copolymer containing repeating units derived from other monomers, such as caprolactone, glycolic acid, but preferably the polymer contains at least 80% by volume of lactic acid monomers or lactide monomers, in particular at least 90% by volume and in particular about 95 to 100% lactic acid monomers or lactide monomers.

In a preferred embodiment, the thermoplastic polymer is selected from the group of lactide homopolymers, blends of lactide homopolymers and other biodegradable thermoplastic homopolymers, with 5-99 wt %, in particular 40 to 99 wt %, of an lactide homopolymer and 1-95 wt %, in particular 1 to 60 wt %, of a biodegradable thermoplastic polymer, and copolymers or block-copolymers of lactide homopolymer and any thermoplastic biodegradable polymer, with 5 to 99 wt %, in particular 40 to 99 wt % of repeating units derived from lactide and 1 to 95 wt %, in particular 1 to 60 wt %, repeating units derived from other polymerizable material.

In one embodiment, polylactic acid or polylactide (which both are referred to by the abbreviation "PLA") is employed. One particularly preferred embodiment comprises using PLA polymers or copolymers which have weight average molecular weights (Mw) of from about 10,000 g/mol to about 600,000 g/mol, preferably below about 500,000 g/mol or about 400,000 g/mol, more preferably from about 50,000 g/mol to about 300,000 g/mol or about 30,000 g/mol to about 400,000 g/mol, and most preferably from about 100, 000 g/mol to 20 about 250,000 g/mol, or from about 50,000 g/mol to about 200,000 g/mol.

When using PLA, it is preferred that the PLA is in the semi-crystalline or partially crystalline form. To form semi-crystalline PLA, it is preferred that at least about 90 mole percent of the repeating units in the polylactide be one of either L- or D-lactide, and even more preferred at least about 95 mole percent.

Examples of other biodegradable thermoplastic polymers include polylactones, poly(lactic acid), poly(caprolactone), polyglycolides as well as copolymers of lactic acid and glycolic acid and polyhydroxyalkanoates (PHAs) or mixture of PHAs and polylactones.

In another embodiment, the thermoplastic polymer has a melting point in the range of about 100 to 130° C. In one embodiment, the thermoplastic polymer is polybutylene adipate terephthalate (also abbreviated PBAT).

The thermoplastic polymer can comprise a neat polymer either in the form of a homopolymer or a copolymer, for example a random copolymer, such as a copolyester of adipic acid, 1,4-butanediol and dimethyl terephthalate. PBAT polymers are typically biodegradable, statistical, aliphatic-aromatic copolyesters. Suitable materials are supplied by BASF under the tradename Ecoflex®. The polymer properties of the PBAT are similar to PE-LD because of its high molecular weight and its long chain-branched molecular structure.

PBAT is classified as a random copolymer due to its random structure. This also means that it cannot crystallize to any significant degree due to the wide absence of any kind of structural order. This leads to several physical properties: wide melting point, low modulus and stiffness, but high flexibility and toughness. In addition to virgin polymers, the composition may also contain recycled polymer materials, in particular recycled biodegradable polymers. Furthermore, the composition may also contain composites of polyesters, such as fiber reinforced PLA, ceramic materials and glass materials (e.g. bioglass, phosphate glass).

The thermoplastic polymer can comprise also Polybutylene Succinate (PBS) which is a biodegradable and compostable polyester, which is produced from succinic acid and 1,4-butanediol. PBS is a crystalline polyester with a melting temperatures between 95 and 120° C.

The thermoplastic material is preferably a biodegradable polymer (only) but also non-biodegradable polymers may be utilized. Examples of such polymers include polyolefins, e.g. polyethylene, polypropylene, and polyesters, e.g. poly (ethylene terephthalate) and poly(butylenes terephthalate) and polyamides. The polymer may also be any cross-linked polymers manufactured prior to processing or in situ during the compounding process for example by means of ionizing radiation or chemical free-radical generators. Examples of such polymers are cross-linked polyesters, such as polycaprolactone.

Combinations of the above biodegradable polymers and said non-biodegradable polymers can also be used. Generally, the weight ratio of biodegradable polymer to any non-biodegradable polymer is 100:1 to 1:100, preferably 50:50 to 100:1 and in particular 75:25 to 100:1. Preferably, the composite material has biodegradable properties greater, the material biodegrades quicker or more completely, than the thermoplastic material alone.

By using an additional polymer component in the polymer material of the first component, mechanical properties of the first component can be improved. Such mechanical properties include tear-resistance.

In one embodiment, the first polymer component has a melt flow index of about 0.5 to 15 g/min, for example 1 to 10 g/min, in particular about 1-3 g/min (at 190° C.; 2.16 kg).

In order to develop a material with a capability to degrade fast in a composting and marine environment and also to have enough rigidity to be utilized in a large number of applications, there is further a biodegradable reinforcement in the polymer that increases the water absorption of the material and also improves its mechanical properties.

The second component is a reinforcing material which comprises or consists essentially of a woody material having a sieved size less than 0.5 mm. There can also be other wood particles present in the second component.

Suitable natural fibers can be obtained directly from lignocellulosic materials, animals, or from industrial process by-products or side streams. Examples of this kind of materials include annual or perennial plants or wooden materials and other crops and plants including plants having hollow stem which belong to main class of Tracheobionta, such as flax, hemp, jute, coir, cotton, sisal, kenaf, bamboo, reed, scouring rush, wild angelica and grass, hay, straw, rice, soybeans, grass seeds as well as crushed seed hulls from cereal grains, in particular of oat, wheat, rye and barley, and coconut shells. In addition, wool, feather and silk can be utilized.

The wood species can be freely selected from deciduous and coniferous wood species alike: beech, birch, alder, aspen, poplar, oak, cedar, *Eucalyptus*, mixed tropical hardwood, pine, spruce and larch tree for example. Other suitable raw-materials can be used, and the woody material of the composite can also be any manufactured wood product.

In a preferred embodiment, the wood material is selected from both hardwood and softwood, in particular from hardwood of the *Populus* species, such as poplar or aspen, or softwood of the genus *Pinus* or *Picea.*

The particles can be derived from wood raw-material typically by cutting or chipping of the raw-material. Wood chips of deciduous or coniferous wood species are preferred, such as chips of aspen or birch.

In addition to wood flour, the present composition can contain reinforcing fibrous material, for example cellulose fibers, such as flax or seed fibers of cotton, wood skin, leaf or bark fibers of jute, hemp, soybean, banana or coconut, stalk fibers (straws) of hey, rice, barley and other crops and plants including plants having hollow stem which belong to main class of Tracheobionta and e.g. the subclass of meadow grasses (bamboo, reed, scouring rush, wild angelica and grass).

Studies carried out in the present context have shown that the swelling of the natural fiber particles, such as wood fibers with a screened particle size equal to or less than 0.5 mm, due to water absorption has enough force to form cracks into the polymer matrix, thus enabling the water to penetrate the material more efficiently and therefore accelerate the material degradation. When the material degrades, the long polymer chains will break down into shorter chain fractions that will eventually degrade into natural compounds, such as carbon dioxide ($CO_2$), water, biomass and inorganic compounds, leaving no residual plastic particles, such as microplastics, or toxic residues in the environment.

The hydrophilic natural fibers or particles, which are capable of swelling inside the matrix upon the exposure to water, are distributed homogeneously within the matrix.

In one embodiment, the hydrophilic particles (including fibers) are preferably non-modified before mixing with the other components of the compositions. "Non-modified" signifies that they have not been subjected to any chemical or physical treatment that would permanently reduce or eliminate their capability of taking up moisture and water before they are mixed with the other components of the compositions. Thus, the hydrophilic particles in the compositions retain at least 20%, preferably at least 40% in particular 50% or more of the water-absorbency of the hydrophilic particles of the feedstock.

As will be explained below, the particles can be dried to low moisture content before mixing, in particular melt-mixing, with the polymer components. Such drying will typically not permanently reduce the capability of the particles to take up moisture or water in the composition.

The herein introduced hydrophilic material, e.g. wood flour, has a screened size of less than 500 mesh (0.5 mm). As a result of producing sheet having wall thickness less than 0.5 mm, preferably less than 0.4 mm surface of the sheet is coarse. Some particles of the wood flour have, prior extrusion, dimensions larger than wall thickness of the produced sheet. These particles evidently are forced to orientate horizontally yet they pop-up of the surface of the sheet.

By this feature, the degradation rate of the composite can be accelerated in moist conditions.

Traditional biodegradable polymers, such as PLA, are biodegradable when the thickness of the material is typically less than 1 mm but their biodegradation speed is not sufficient in many types of natural environments (e.g., seas, lakes, soil), i.e., they require high temperatures and humidity levels in order to degrade. They also do not possess sufficient mechanical properties and thermal deformation resistance, which considerably limits their suitability for a large number of applications.

The degradation rate is highly dependent on the surface area of the material. For example, a solid product produced from polylactide or polylactic acid (abbreviated "PLA"), e.g. a straw, having a smooth surface will take 5 to 10 years to decade completely, whereas PLA powder having a particle size between 100 to 250 μm will degrade approximately 3 wt % in a week (completely within one year) e.g. in an anaerobic sludge.

In one embodiment, the compositions and the articles shaped therefrom have a rough (or "coarse") surface quality. To that aim and for achieving good mechanical performance of the extruded product, the raw materials used in the processing need to be dried prior to processing. If the moisture content in the raw materials is too high, the water will evaporate from the materials during processing, resulting in the formation of pores and streaks in the product. These undesired pores will cease production by tearing the sheet or tube extrudate apart.

In one embodiment, the moisture content in the composite granules is reduced to less than 2% before processing.

A composition comprising merely the first and the second components typically is rigid. The polymer of the first component is hard. This kind of composition is, according to the present technology, converted to a semi-rigid structure with help of at least one additional polymer or by mechanical processing, by incorporating, polymer rich regions into the material or a combination of two or more of these.

Thus, the present composite material typically comprises regions of elasticity to provide for objects having properties of flexibility.

Such regions of elasticity can be achieved in a plurality of ways.

In a first embodiment, the composition comprises a third component formed by a polymer different from the polymer of the first component, said polymer of the third component being capable of forming into the material regions of elasticity in order to confer to the composite material mechanical properties in the range from flexibility to semi-rigidity in at least one dimension of the object at ambient temperature.

The flexible properties of the novel composition are achieved by adding an elastic biopolymer, in the following also "third component" to the first component. The elastomer can be thermoplastic or thermosetting polymer. To maintain the general relation between polymer and reinforcing agent, a part of the first component, i.e. the high-temperature polymer, can be replaced by elastic polymer, thus maintaining the volume part of the polymer in the composite material at least essentially unaltered-typically a variation of +20% of the polymer volume is possible.

Typically, the third component is formed by a polymer having an elongation at break of 100% or more, in particular 200 or more.

The third component can be formed by a polymer selected from the group of biodegradable thermoplastic polymers such as PBS and PBAT; unsaturated or saturated rubbers, including natural rubber, silicon; and natural or synthetic soft material, including soft gelatin, hydrogels, hydrocolloids and modified cellulose; natural gums such as gum Arabic, agar, dammar gum.

The third component, i.e. the elastic or soft polymer, does not need to have melting range in same range as the first component. Typically, the third component has a melting range outside that of the first component, in particular the melting point of the polymer of the third component is lower than the melting point of the first component.

In an embodiment of a composite material according to the present technology, the third component is miscible with first component forming a homogenous matrix when processed at elevated temperatures.

In another embodiment, the third component is immiscible with the first component forming phase-separated zones or regions within the first component.

In one embodiment, the present composite material exhibits an elongation of at least 5%, for example 7.5 to 25%, determined by ISO 527. Typically, such elongation is achieved at 23° C.

In one embodiment, the present composite materials exhibit marine degradation of at least 25%, typically at least about 30% and up to 40 or even up to 50%, after 300 days, measured according to ASTM D7081.

Based on the above, in one embodiment of the present technology, the composite material comprises, consists of or consists essentially of about 40 to 70 parts by weight of a biodegradable polyester;

10 to 40 parts by weight of lignocellulosic particles; and 10 to 40 parts by weight of an elastic biodegradable polymer;

0.5 to 5 parts by weight of processing aid additive(s); and 0 to 10 parts by weight of a water soluble material Preferably the elastic biodegradable polymer, together with the biodegradable rigid polymer, such as polyester, makes up a majority of the composition (i.e. more than 50% by weight of the total weight of the composition). In a particular preferred embodiment, the elastic biodegradable polymer together with the biodegradable polylactide make up at least 60% and up to 90%, for example 70 to 85%, by weight of the total weight of the composition. The elastic polymer generally forms 5 to 50%, in particular 10 to 40%, for example 15 to 30%, by weight of the total weight of the biodegradable polyester together with the elastic polymer.

It is possible to incorporate further polymers or any natural water soluble compounds into the composition. In one embodiment, the composition comprises 3 to 30 parts by weight, of a fourth component comprising a thermoplastic polymer different from that of the first and the third component. Such a component can be used for achieving improved mechanical properties of the matrix polymer. It is also possible to use a fourth polymer to modify the surface properties (for example migration properties of straw) of the composition. The fourth component may also comprise of polysaccharides which are polymeric carbohydrate molecules composed of long chains of monosaccharide units bound together by glycosidic linkages, and on hydrolysis give the constituent monosaccharides or oligosaccharides such as maltodextrin or starch.

In one embodiment, the fourth component is formed by a natural water soluble material having a water solubility level of more than 100 g/dm$^3$.

Based on the above, in one embodiment of the present technology, the composite material comprises, consists of, or consists essentially of about 40 to 70 parts by weight of polylactide, 10 to 40 parts by weight of wood particles having a screened size of less than 0.5 mm or wood fibers, 10 to 30 parts by weight of PBAT and 0 or up to 1 part by weight of wax.

The present technology relates to the manufacturing, by melt processing, of biodegradable composite articles having a coarse surface. In particular, embodiments concern the use of compositions comprising a continuous matrix of a mixture of thermoplastic biodegradable polymers and wood particles distributed within the matrix in such methods, in particular by extrusion molding processing.

Thus, in one embodiment, the surface of the sheet is coarse. In the present context, “coarse” stands for a surface which has a surface roughness (Ra) of more than 1 μm, as determined according to ISO 4287. Such surfaces, typically formed of wood-PLA composites containing more than 10 wt % wood, have increased water absorption.

In one embodiment, the composite material when shaped into an object, for example a tubular object, such as one of the kind referred to in the foregoing paragraph, is capable of exhibiting a surface roughness of more than 1 μm as determined by ISO 4287.

By contrast, tests have shown that when surfaces formed from composites of wood-PLA with less than 10 wt % wood particles and having a Ra value of less than 1.0 μm, as determined by ISO 4287, will absorb water slowly which increases degradation time.

The compounding of the first and the second component, and third components, described above, is typically carried out in, e.g., an extruder, in particular a single or dual screw extruder. In the compounding process the screw extruder profile of the screw is preferably such that its dimensions will allow wood flour to move along the screw without crushing or burning them. Thus, the channel width and flight depth are selected so that the formation of excessive local pressure increases, potentially causing crushing of the wood particles, are avoided. The temperature of the cylinder and the screw rotation speed are also selected such as to avoid decomposition of wood chip structure by excessively high pressure during extrusion.

Compounding of wood based composites requires proper temperature control. The mixing in an extrusion assembly increases mass temperature due to increased level of friction between polymers and wood.

In one embodiment, to prevent the thermal degradation of natural fibers, the processing temperatures during the process are kept below 220° C. To reduce or prevent the degradation of the polymers and natural fibers during the processing, the L/D ratio of the composition should be at least 20:1.

Further, in one embodiment, the temperatures during compounding are below 200° C. The melting points for some of the used polymers are above 160° C. which, in this embodiment, leaves an operational window of 40° C.

In one embodiment, compounding is carried out at a temperature in the range of 110 to 210° C., in particular 150 to 200° C.

In still a further one embodiment, the barrel temperature is in the range of about 160 to 190° C. from hopper to die, while the screw rotation speed is between 25 and 50 rpm. These are, naturally, only indicative data and the exact settings will depend on the actual apparatus used.

In one embodiment, a composite material as described herein is capable of being shaped by melt processing into an article having at least one wall which has a total thickness of less than 0.5 mm and more than 0.2 mm.

Fillers and additives can be added to reach a smooth flow of the material in an extruder.

The typical content of mineral fillers, if any, amounts from about 0.1 to 40 wt %, in particular from about 1 to 20 wt %.

Other mineral fillers and pigments may also be present in the first composition. Further examples of mineral fillers and pigments are calcium sulphate, barium sulphate, zinc sulphate, titanium dioxide, aluminium oxides, and aluminosilicates.

In an embodiment, the first composition contains mineral fillers, such as talc, calcium carbonate ($CaCO_3$) or kaolin. Silica is another filler that can be used.

In an embodiment, the composite further contains particles of finely divided material giving color properties to the composite. The dying material can, for example, be selected from bio-based materials having an adequate stability at the melt processing temperatures, which can be up to 210° C.

One embodiment comprises using other additives in the composite formulations. For example, maleic anhydride grafted PLA (MA-PLA) can be used to chemically bond wood fibers and polymer matrix together. This results in better mechanical properties of the composite material and also improves the material’s resistance to water, which is based on the reduction in the number of free —OH-groups on the surface of the natural fibers. Maleic anhydride can be grafted into all types of biodegradable polymers (e.g. PBAT and PCL). The amount of used MA-grafted polymers amounts to 1-7 wt %, in particular to 1-3 wt %.

Oleic acid amides, waxes, metal stearates (e.g., zinc and calcium), mineral fillers (e.g., talc) and lignin can be added to the formulation as a processing aid to improve the processability of the materials for thin-walled applications. Oleic acid amides, waxes and metal stearates are added to reduce the internal friction of the material during extrusion. This decreases materials' inherent tendency to thermally degrade during processing and results in better dispersion of wood fibers in the material. The long fatty chains present in oleic acid amides, waxes, lignin and metal stearates can also decrease the water absorption of the material.

Metal stearates and some mineral fillers, such as $CaCO_3$ can also act as acid scavengers to neutralize the acids released from natural fibers and polymers during processing. Lignin is also capable of improving the mechanical properties of the composite. The typical dosage of oleic amides and waxes is 0.1-7 wt %, whereas the amount of metal stearates in the composites is 0.5-7 wt %. The amount of used mineral fillers is from 0.1 wt % to 20 wt %. The dosage of lignin is 0.1-2 wt %.

One group of lubricants found applicable for reducing friction are waxes, such as natural vegetal or animal waxes, e.g. candelilla, carnauba, bee wax etc. They comprise mostly of hydrocarbons, fatty esters, alcohols, free fatty acids, and resins (e.g. triterpenoid esters). The typical dosage of waxes is 0.1-3 wt %.

In one embodiment, one or many of the additives presented above are incorporated to the composite formulation with dosage of 0.1 and up to 10 wt %, in particular of about 1 to 5 wt %, preferably approximately 3 wt %. The additive or a mixture of additives are added to the mixture of biodegradable polymer(s) and wood chips before further processing and the manufacturing of the product.

One embodiment comprises a method of producing thin-walled composite material from at least one thermoplastic polymer having a melting points greater than 110° C., in particular greater than 130° C., and MFR ranging between 1 and 70 g/10 min (190° C./2.16 kg), in particular between 3 and 6 g/10 min. The polymer is a biodegradable polymer or a mixture of biodegradable polymers, which is being mixed at a mixing ratio of 99:1 to 35:65 by weight with natural fiber particles having a sieved size equal to or less than 0.5 mm.

The mixture can also contain one or more of, e.g., the previously mentioned additives up to the contents of 10 wt %, the share being deducted either from the mass of the polymer or natural fibers.

In one embodiment, additives are included in amounts of up to about 5 wt %, preferably less than 3 wt %.

Prior to feeding into the hopper of the extrusion machine, the mixture is pelletized to form granulates or pellets.

For example wood flour, as such, is not feasible for extrusion of thin walled products. It has a tendency to agglomerate during feeding process, which disrupts uniform flow of the composite during extrusion leading to break down of the extrudate in a continuous process. The problem was solved by compounding all raw materials together into granules.

In one embodiment, a composite material is produced by compounding a thermoplastic polymer, or a mixture of several thermoplastic polymers, as disclosed in embodiments herein, with a particles of a hydrophilic material, having a sieved size of less than 0.5 mm, in a melt mixing apparatus to produce a compounded melt mixture granules, providing an extrudate of the melt mixture by pultrusion or pulling-out through a mould or nozzle, and optionally shaping the extrudate into the form of a plate or a sheet or tube.

In one embodiment, the hydrophilic material is first combined with one polymer to provide an extrudate, and the extrudate is then combined with extrudates or pellets of the other polymer material(s). The compounded material or material obtained by melt mixing of the present components can be processed with any of the following methods: machining, compression molding, transfer molding, injection molding, extrusion, rotational molding, blow molding, thermoforming, casting, forging, and foam molding.

In one embodiment, products made from the combination of biodegradable polymer(s) and natural fibers (e.g., wood) are recycled by means of crushing the products mechanically and mixing the crushed materials at dosages up to 100 wt %, in particular from 1 wt % to 100 wt %, with a virgin mixture of biodegradable polymer(s) and natural fibers. The mixture of crushed and virgin material is eventually fed into the hopper of extrusion or injection molding machine to form a new product containing 5-100 wt % of recycled material.

In one embodiment, the composition may also contain recycled polymer materials, in particular recycled biodegradable polymers. In addition, the natural fiber used in the composition may also be recycled mechanically and/or chemically.

An article manufactured from a composition as described above can be shaped into thin-walled, in particular extruded, article having properties of flexibility or elasticity. The articles can be shaped as elongated objects, as sheets, plates, boards, panels, tube, pipes, or profiles.

In one embodiment, the product is thin-walled, i.e., it has a wall thickness of equal to or less than 0.5 mm and more than 0.05 mm. It may also contain areas in where the wall thicknesses are between 0.1 to 0.2 mm.

In one embodiment, the article is provided with a coating to modify, if necessary, the surface of the article. The coating can be produced by means of multicomponent extrusion molding or e.g. traditional spraying or dip-coating.

In one embodiment, an article is provided in the shape of a sheet or a tube consisting or consisting essentially of a material or composition as disclosed above, for example 40 to 70 parts by weight of polylactide, 10 to 40 parts by weight of wood particles having a screened size of less than 0.5 mm, 10 to 30 parts by weight of PBAT and 0 or up to 1 part by weight of wax. In one embodiment, the article has a wall containing wood fibers or wood particles in a concentration of 10 to 30 wt %. The wall of the article exhibits an overall migration level for water-ethanol solution with an ethanol content of 0-96 wt %, in particular 5 to 95 wt %, of less than 10 mg/dm$^2$. The migration tests have been carried out pursuant to the EN1186-3:2002 standard.

In one embodiment, an article is in the shape of a container or closed article consisting of or consisting essentially of a material or composition (or composite material) as discussed above, for example 40 to 70 parts by weight of polylactide, 10 to 40 parts by weight of wood particles having a screened size of less than 0.5 mm, 10 to 30 parts by weight of PHAT and 0 or up to 1 part by weight of wax. In one embodiment, the article has a wall containing wood fibers or particles in a concentration of 10 to 30 wt %. In one embodiment, the article has a wall containing wood fibers or particles in a concentration of 10 to 30 wt %. The wall of the article exhibits an overall migration level for 3 wt % acetic acid is less than 10 $mg/dm^2$. The migration tests have been carried out pursuant to the EN1186-3:2002 standard.

Examples

A composite comprising polylactide about 59 wt %, 20 wt % of wood particles having a screened size of less than 0.5 mm, 20 wt % of PBAT and 1 wt % of wax was tested for its properties.

In some of the examples, the proportion of wood particles was reduced and the relative proportions of the polymer components correspondingly increased.

Degradation

Degradation in marine environment was studied for a sheet made of the composite material which was capable of being shaped into a straw (also referred to as a "Sulapac® Straw").

In this study, there were two potential routes for mass loss that were assessed, viz. physical degradation and biological degradation. With regard to physical degradation, no indications of such degradation was detected in the study. Biological degradation could, however, be seen on the surface of the material. Further, it was found that amount of surface degradation was directly proportional to the overall degradation occurring simultaneously of the sample. Thus, the surface degradation was taken as a measure of the degradation rate of the Sulapac® Straw material.

Based on the study, after 6 months of immersion in the Baltic Sea, the degradation rate of a sheet that had a thickness of 100 μm and a weight of 394 mg was 1.09 mg/day or 0.27 μm/day. Thus, the minimum degradation rate of a Sulapac® straw is expected to be 1.09 mg/day or 0.27 μm/day in the Baltic Sea.

Surface Roughness

Roughness of the surface is directly proportional to the effective area of the surface. Therefore, the roughness value is a measure of the effective surface area normalized in proportion to the area being considered.

Surface roughness measurements were done with Weeko Wyko NT9100 optical profilometer. Similar samples as before were used, having a wood content of 0%, 10% and 20%. The surface roughness was determined by 5 measurements of both sides of the samples so that the results are given as averages of 10 measurements. The differences between the inside and the outside of the sample are within the margin of error. In this analysis, samples with wood contents of 10% and 20%, respectively, were outside the measuring range in many cases. Still the average values given by the method are reliable, but the highest and lowest points could not be determined reliably.

Figure 2:
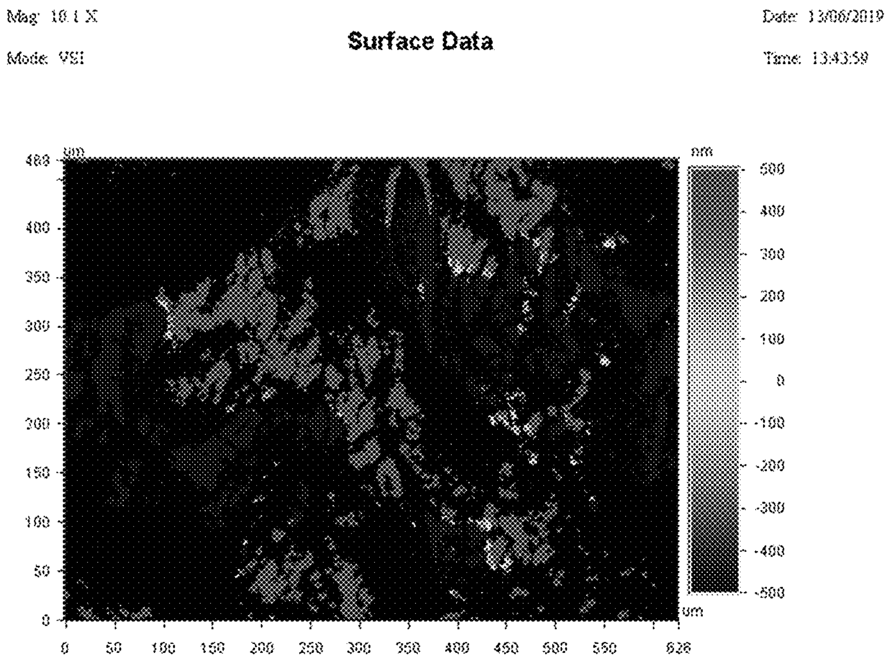
FIG. 2 shows example surface data from a sample containing 10% wood.
Figure 3:
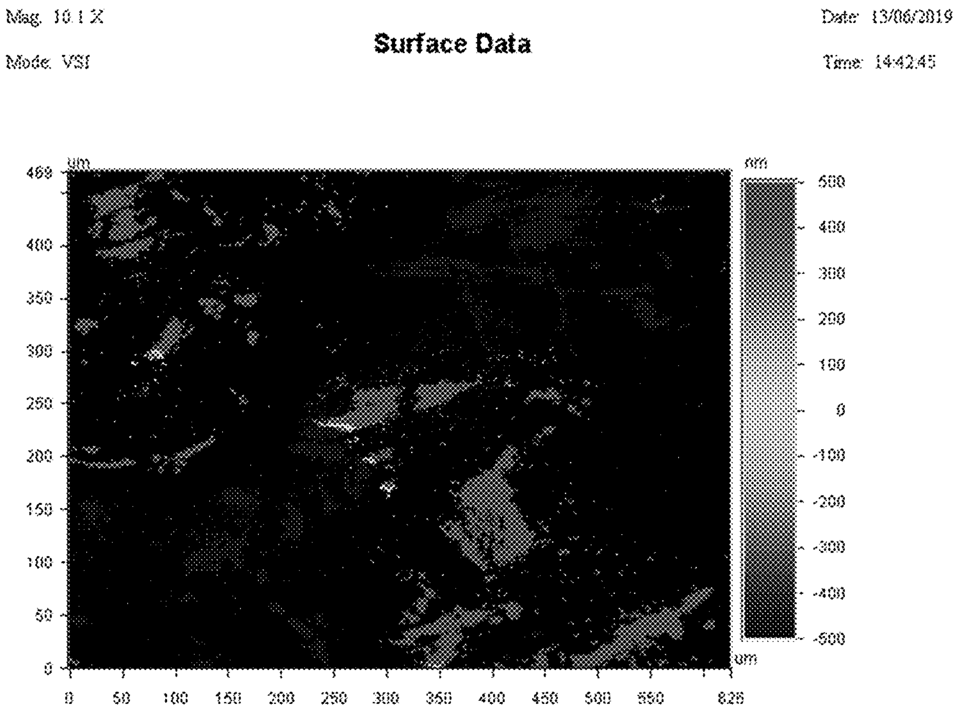
FIG. 3 shows example surface data from a sample containing 10% wood.

Table 1 indicates the average roughness of the samples, and FIG. 1-3 show example surface data from samples containing 0%, 10% and 20% wood respectively.

TABLE 1

Average roughness (Ra) measured with optical profilometer

| | Wood content (%) | | |
|---|---|---|---|
| | 0 | 10 | 20 |
| Surface roughness average (μm) | 2.42 | 10.58 | 17.03 |
| Normalized surface roughness (% of 0% sample) | 1 | 4.37 | 7.04 |

As shown in Table 1, the roughness averages of materials that contain wood had a roughness averages approximately 4 and 7 times higher than materials with no wood content. Therefore, it can be concluded that increasing the wood content increases effective surface area and therefore degradation rate of the product.

Water uptake of the material was studied as a function of wood content with similar samples as before. The studied materials were similar in respect to polymer composition. The study was performed with 3 parallel samples and reported results are averages. Before weighing, the samples were dried with paper to remove extra water on top of the samples. The results of the study are presented in Table 2.

TABLE 2

Water uptake as percentage of original sample mass

| | Room temperature (23 °C) | | 45 °C | |
|---|---|---|---|---|
| Wood content (wt %) | Weight increase after 1 weeks (%) | Weight increase after 4 weeks (%) | Weight increase after 1 weeks (%) | Weight increase after 4 weeks (%) |
| 0 | 0.5 | 1.3 | 0.83 | 2.2 |
| 10 | 1.8 | 3.2 | 4.6 | 7.5 |
| 20 | 6.3 | 8.4 | 10.4 | 13.8 |

Figure 4:
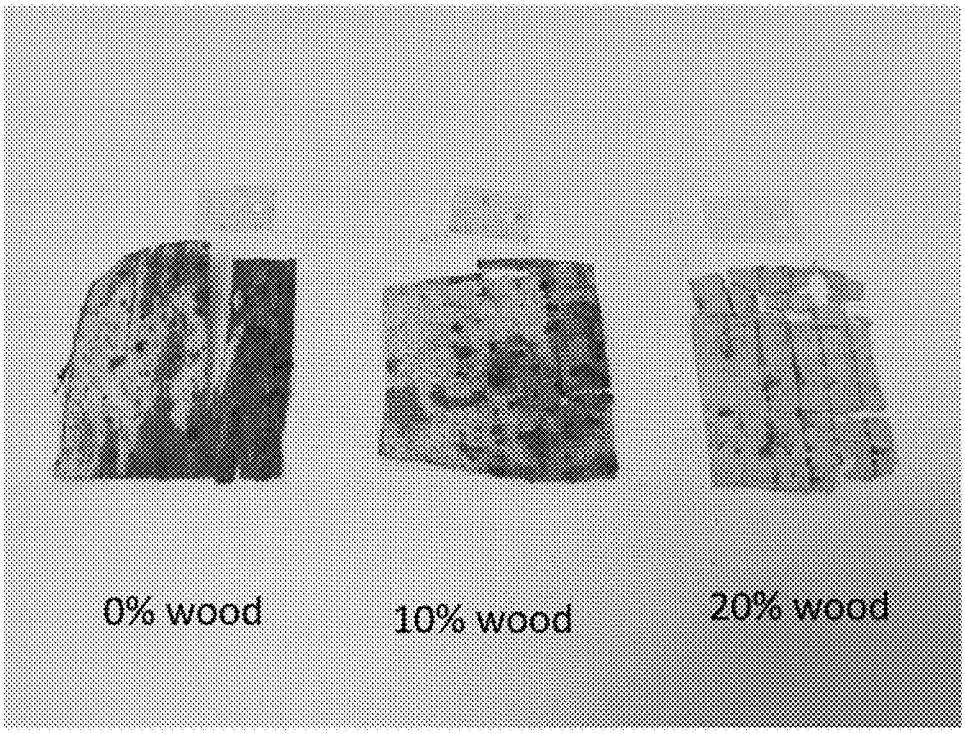
FIG. 4 shows disintegration of material with different wood contents in industrial compost.

As can be seen in Table 2, the higher the wood content, the more water was taken up by the material. The amount of water was significantly higher in the samples with wood than in the samples without wood. In Table 3, degradation of samples with different wood content is shown. In the conditions of an industrial compost degradation is efficient enough with a wall thickness small enough so that the wood content has no significant effect on the detected degradation speed over a timescale of several weeks. Still, disintegration of material is faster with higher wood content and is shown in FIG. 4: degradation of materials with different wood contents in industrial compost environment within a three week period is presented.

TABLE 3

Degradation of the present material in an industrial compost

| | Wood content (%) | | |
|---|---|---|---|
| | 0 | 10 | 20 |
| Degradation (%) | 60 | 61 | 57 |

Effect of Water

As shown before, the amount of water absorbed by the material increases as a function of wood content. Another known phenomenon of wood is to swell when placed in contact with water. When the present material is contacted with water, the wood particles inside the matrix start to swell. Swelling causes formation of micro cracks thoroughly the material starting from surface. These micro cracks are shown in the SEM pictures below.

Cracks in the surface increase the surface area even further. For materials containing no wood, cracks cannot be detected at any temperature. For samples containing 10% wood small starts of the cracks are detected in the pictures. From samples with 20% wood content cracks can easily be detected.

The material was examined with a Zeiss Sigma VP scanning electron microscope (SEM) at 2 kV acceleration voltage with secondary electron (SE) detector.

The depicted materials are similar as before containing 0%, 10% and 20% wood. The samples are kept under water for 1 month and dried at room temperature after treatment. Materials used for reference were kept at regular storage conditions at room temperature and humidity.

Figure 5:
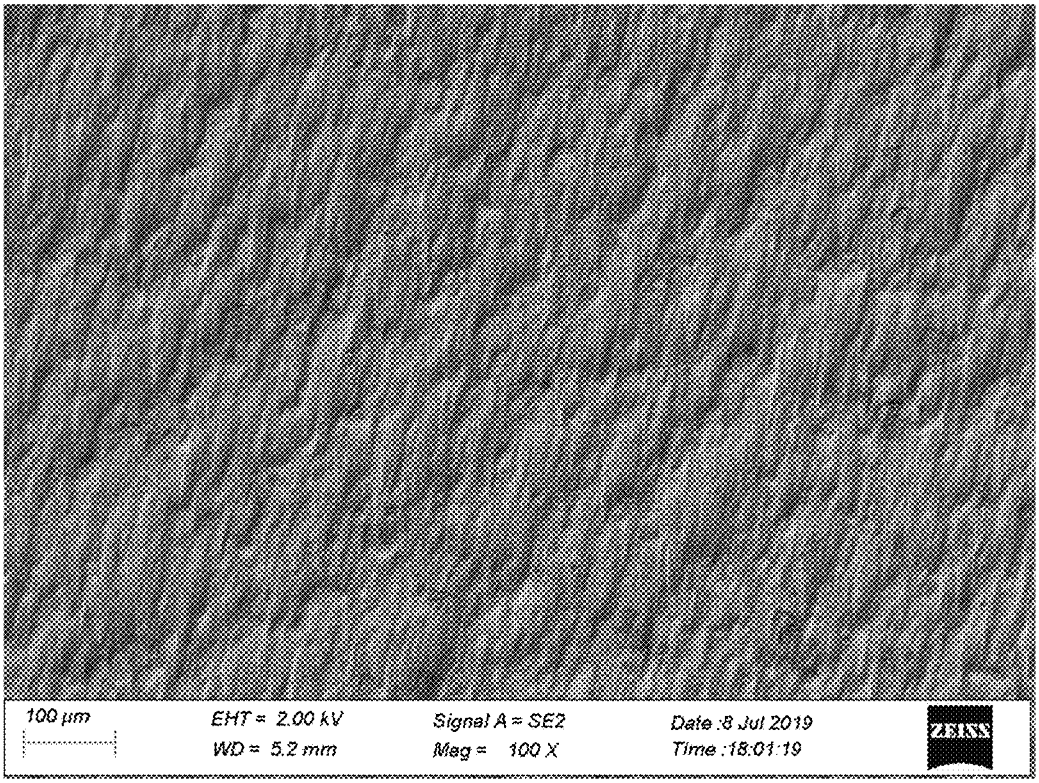
FIG. 5 shows an SEM image of a non-treated sample containing 0% wood.
Figure 6:
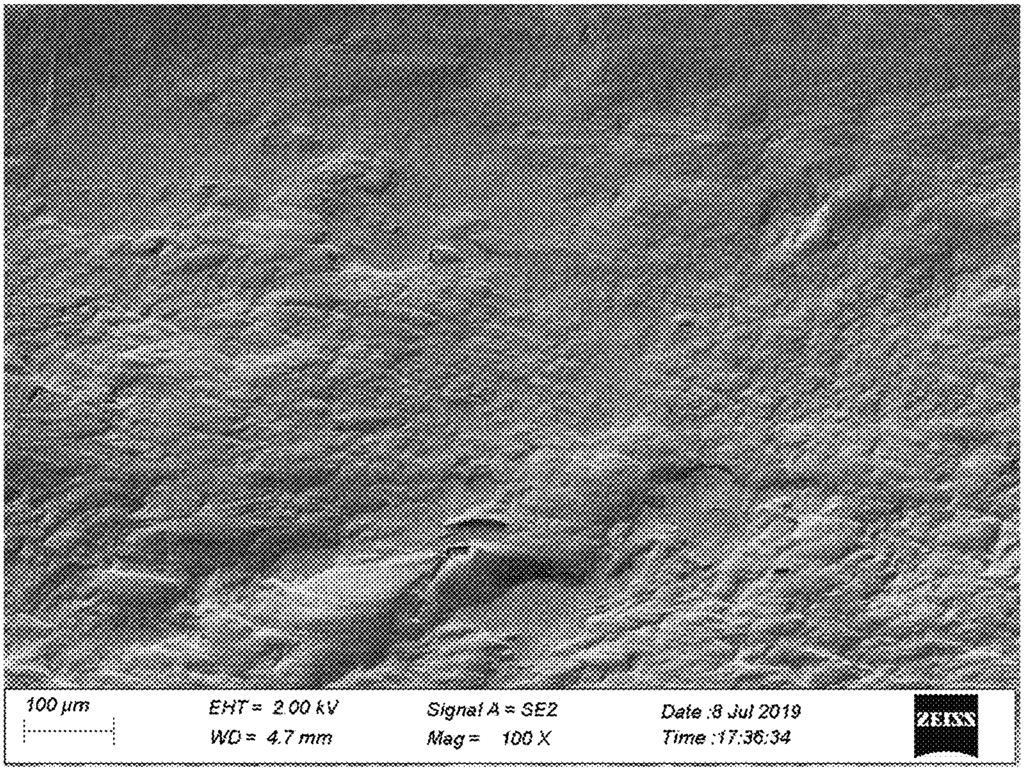
FIG. 6 shows an SEM image of a non-treated sample containing 10% wood.
Figure 7:
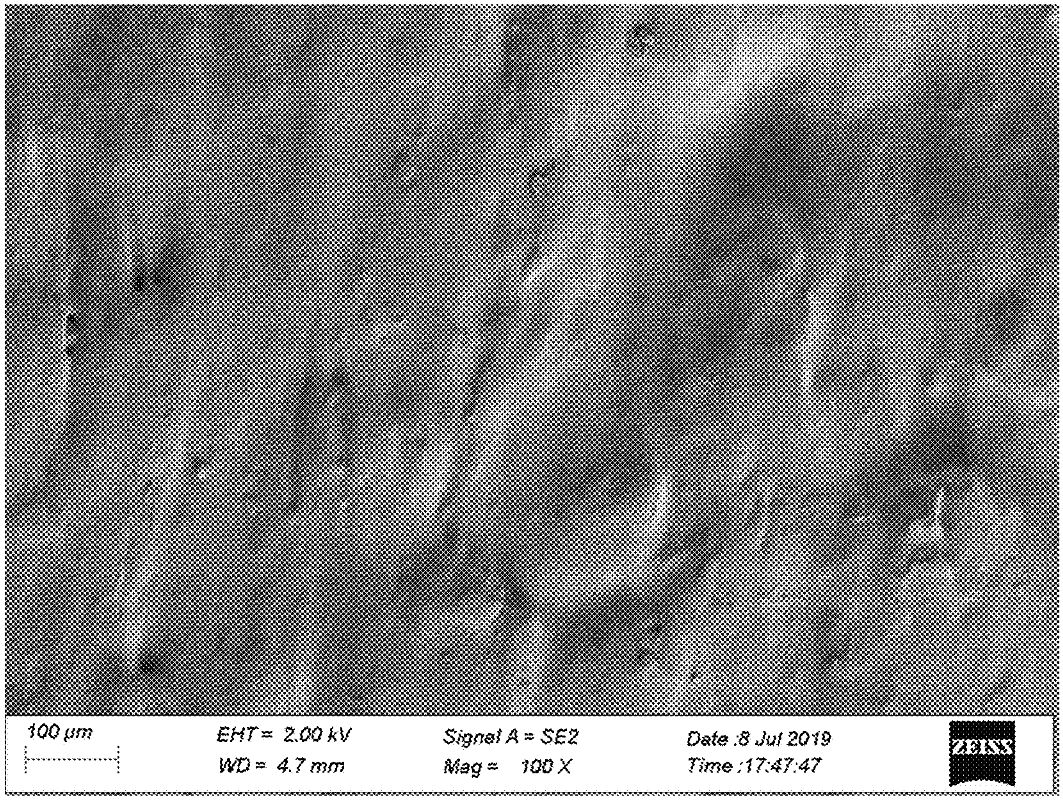
FIG. 7 shows an SEM image of a non-treated sample containing 20% wood.
Figure 8:
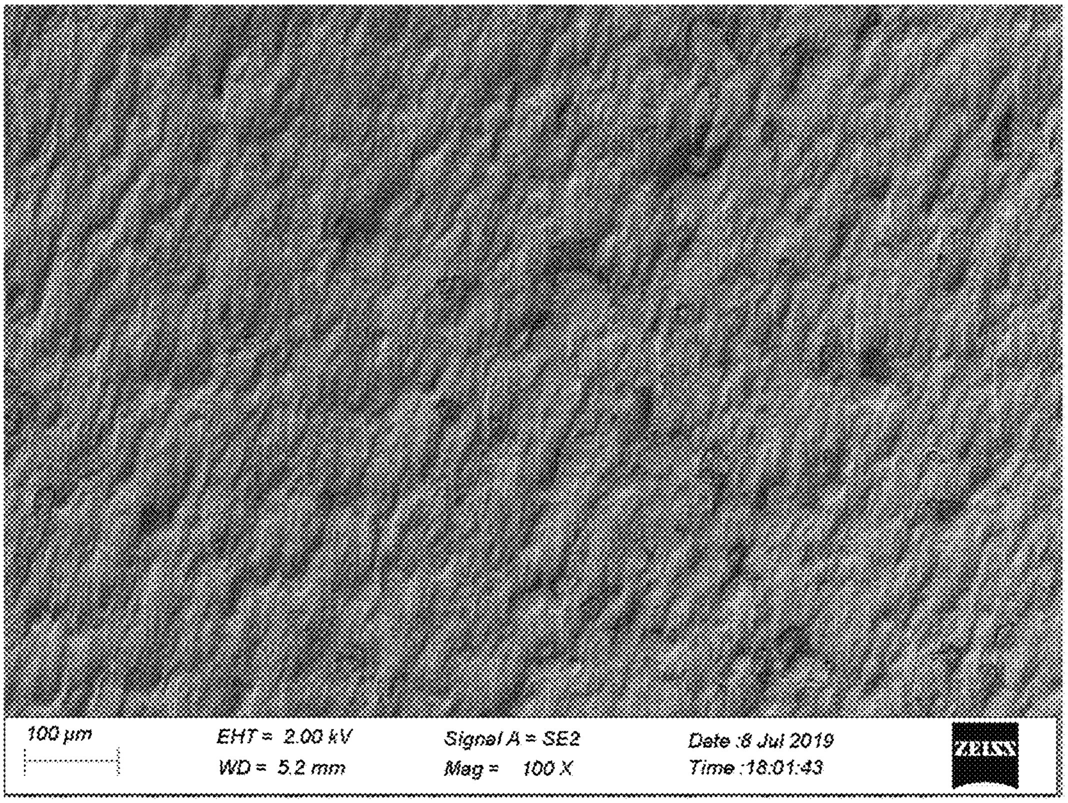
FIG. 8 shows an SEM image of a sample containing 0% wood after 4 weeks water immersion at room temperature.
Figure 9:
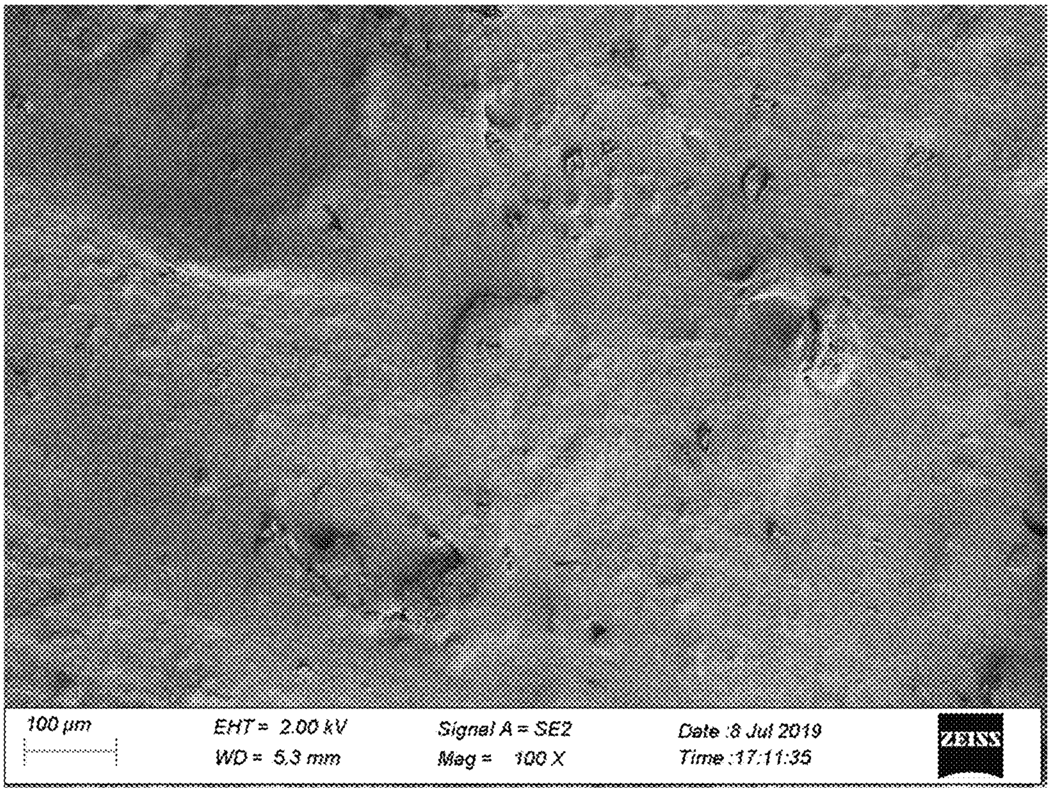
FIG. 9 shows an SEM image of a sample containing 10% wood after 4 weeks water immersion at room temperature.
Figure 10:
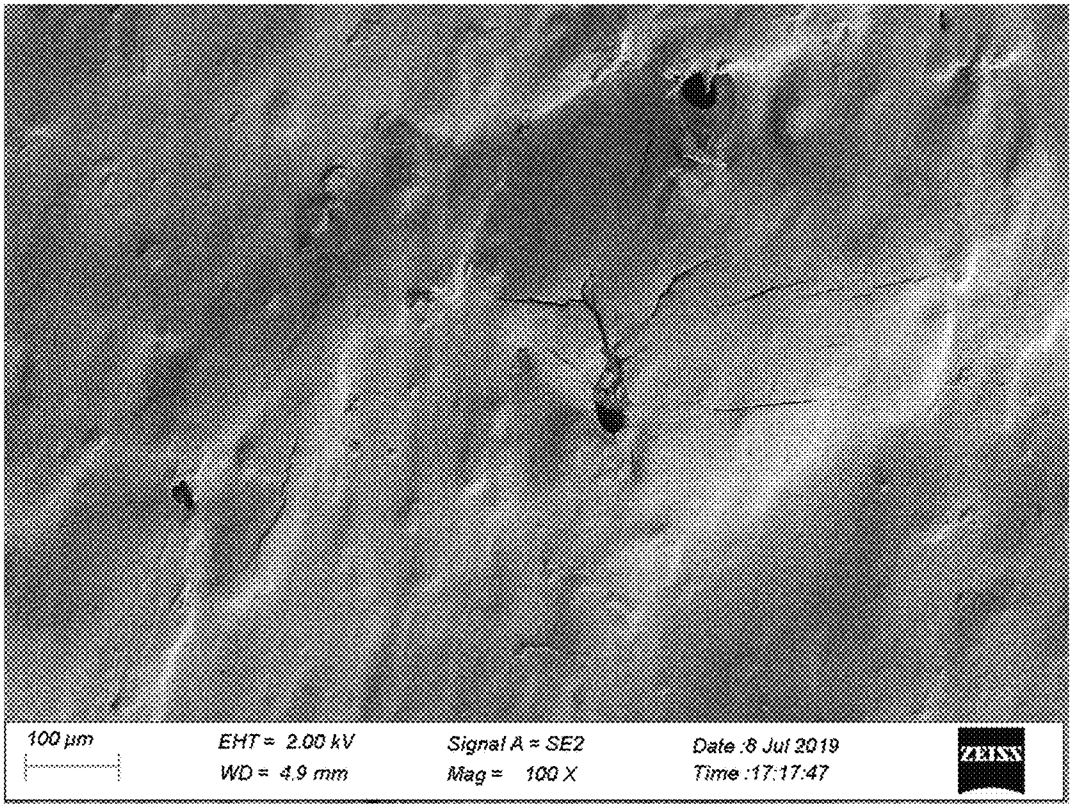
FIG. 10 shows an SEM image of a sample containing 20% wood after 4 weeks water immersion at room temperature.
Figure 11:
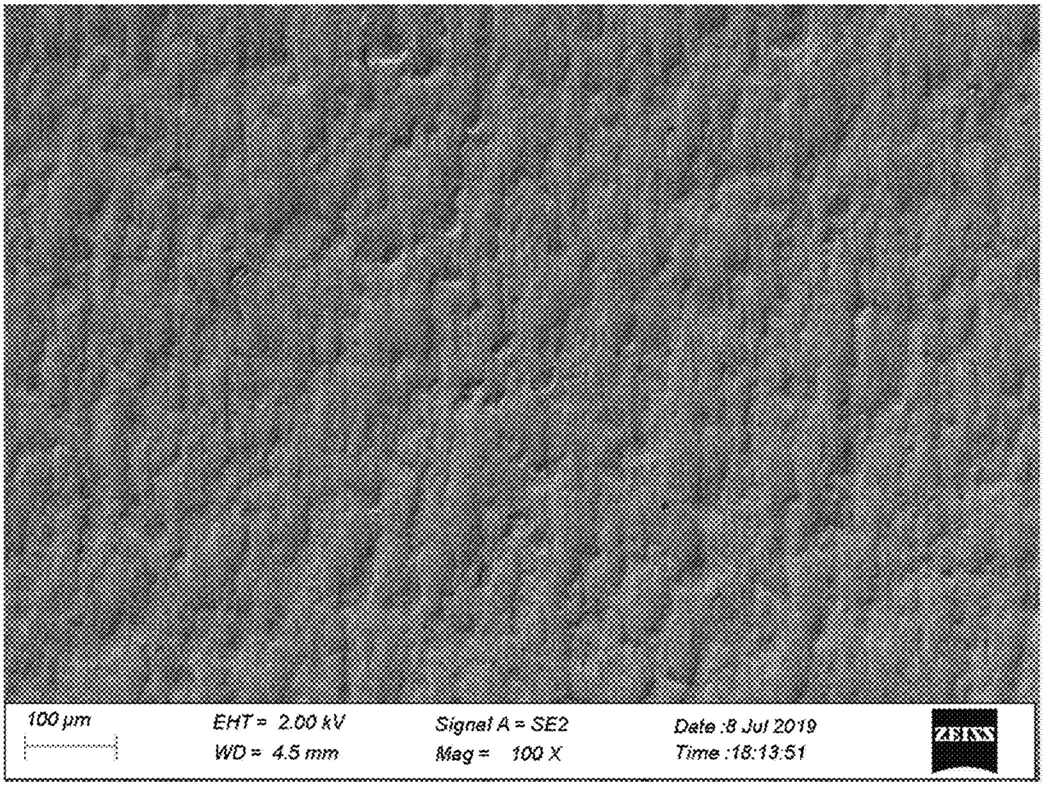
FIG. 11 shows an SEM image of a sample containing 0% wood after 4 weeks water immersion at 45° C.
Figure 12:
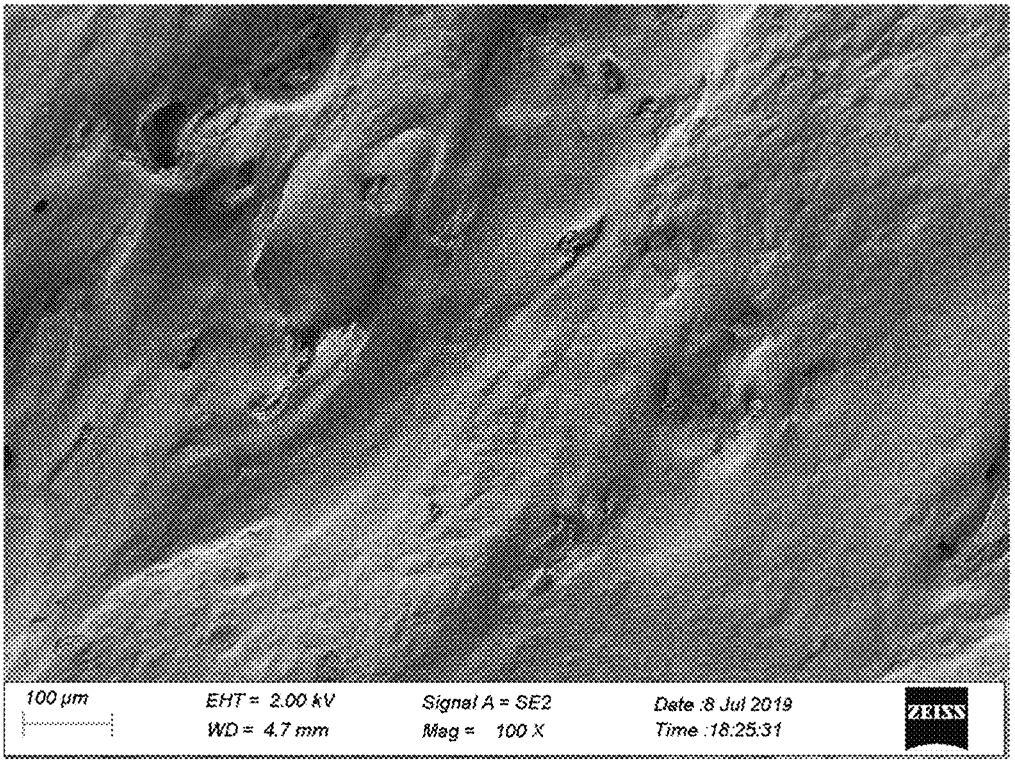
FIG. 12 shows an SEM image of a sample containing 10% wood after 4 weeks water immersion at 45° C.
Figure 13:
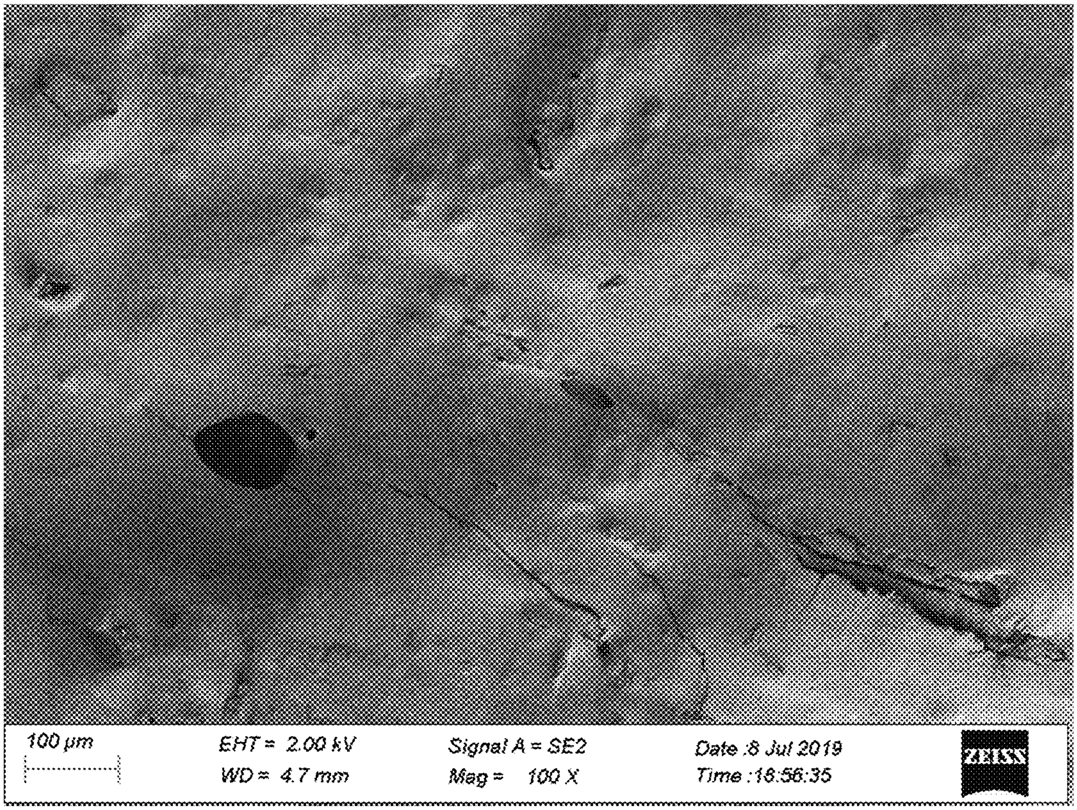
FIG. 13 shows an SEM image of a sample containing 20% wood after 4 weeks water immersion at 45° C.

FIGS. 5-7 are SEM images of non-treated surfaces of samples containing 0%, 10% and 20% wood, respectively. FIGS. 8-10 are SEM images of the same samples after water immersion for 4 weeks at room temperature. FIGS. 11-13 are SEM images of same samples after water immersion for 4 weeks at 45° C.

The figures clearly demonstrate stress-cracking of samples after swelling of the wood particles.

Table 4 shows typical ma 1 properties of the material. Thermal properties were studied with TA Q2000 Differential Scanning calorimeter (DSC) with a heating temperature of 20° C./min and 5° C./min, indicating that the results were identical. Mechanical data were studied with TA Q800 Dynamical Mechanical Analysis (DMA) using a force ramp of 3 N/min.

TABLE 4

Properties of the exemplary materials as described herein
SELECTED MATERIAL PROPERTIES

| PROPERTY | UNIT | TYPICAL VALUE |
|---|---|---|
| Rheological properties | | |
| MFI (190 °C/2.16 kg) | g/10 min | 1.9-2.6 |
| Mechanical properties | | DMA, 3N/min |
| Yield stress | MPa | 13 |
| Yield elongation | % | 3 |
| Tensile modulus | MPa | 900 |
| Stress at brake | MPa | 16 |
| Elongation at brake | % | 10 |
| Softening point | °C | 61 |
| Optimal elongation temperature | °C | 65 |
| End of elongating region | °C | 70 |
| Thermal properties | | 10 °C/min |
| Melting point | °C | 150 |
| Glass transition temperature | °C | 58 |
| Other physical properties | | |
| Material density | g/cm$^3$ | 1.18 |

Effect of Cavities in the Wood-Composite Matrix

All the natural fibers are very hydrophilic materials and they are strongly influenced by water. The water molecules enter the free space of micro voids and diffuse rapidly along the fiber matrix interphase. Exposure to moisture results in significant drops in mechanical properties due to the degradation of the fiber-matrix interphase. The moisture affects fiber/biopolymer bond or interface region and the fiber itself, leading to weakening of overall composite performance. The macroscopic and microscopic changes confirm the decrease in the tensile strength of the composite due to degradation. Tensile properties of the PLA/wood composites decreases on exposure of the samples to natural weathering conditions.

Table 5 presents mechanical weakening of wood composite materials containing 20% wood particles after immersion in water at room temperature and at 45° C. (within a 30 day period of time).

As can be seen, Young's modulus is decreasing in both cases. When immersing the samples at room temperature no considerable change in elongation at brake or stress at brake can be detected. Decrease in Young's modulus shows that the material was losing its elasticity and became more brittle.

TABLE 5

Mechanical weakening of wood composite by the effect of water

| | Elongation at brake (%) | Stress at brake (MPa) | Young's modulus (MPa) |
|---|---|---|---|
| Reference | 9.7 | 16.046 | 988 |
| RT immersion | 11.7 | 15.49 | 757 |
| 45 °C immersion | 2.1 | 7.2 | 613 |

Thermoforming

The elongation at break under tensile stress is between 4 and 8% for PLA which is relatively very low and good tension control during sheet handling is critical as sudden increases in tension during processing may result in structure breaks. The toughness of PLA increases with orientation and therefore thermoformed articles are less brittle than PLA sheet and the elongation to break under tensile stress may increase from 4-8% in sheet to about 40%. Areas that receive less orientation tend to be more brittle than the rest of the thermoformed part.

The present material reveals increased elongation also on those areas. Edge preheaters are necessary to prevent the sheet from cracking. The edge preheaters are set to near 190° C.

Contact heat edge preheaters would typically be set to 100° C. or less. Optimal thermoforming temperature for the present material is around 70° C. which revealed elongation at brake value around 350% which is the limit of the instrumentation used.

Thermoforming properties of the present material are described below. Prior thermoforming the manufactured sheets may have thicknesses up to 5 mm which have thicknesses after processing between 0.2 mm and 1 mm.

Controlled Deformation of Wood Composites

Figure 14:
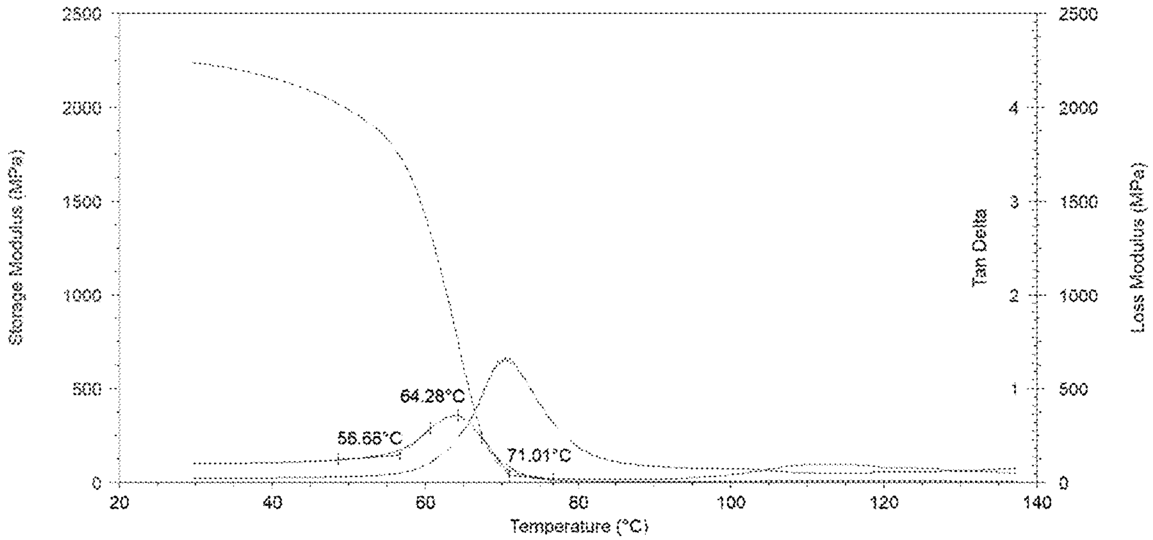

As previously demonstrated, conventional wood composites are quite rigid. The present material containing flexible thermoplastic part can be deformed freely at moderate temperatures. Elongation at brake of the material is averaged in 9.7% in room temperature. Oscillation measurement for the material of consideration with wood content of 20% is done with TA Q800 DSC. Measurement is performed with temperature ramp of 3° C./min, 1 Hz frequency and 1% strain. In FIG. 14, Storage modulus (G'), loss modulus (G") and tan δ are presented as a function of temperature.

While following the "Loss modulus" of oscillation measurement, the liquid like behavior of the material can be analyzed. In this case at temperatures below 50° C. Solid (elastic) like properties of material dominate. That is seen in quite high Young's modulus and low elongation at brake. When the material is heated up, a decrease in Storage modulus and an increase in loss modulus is detected. In this region (~60-70° C.) the material has properties that range from viscotic (viscous) liquid that can be deformed freely to elastic solid that returns to its shape after deformation. With a proper mixture of these properties the material can be extended to an elongation of more than 300% before brake. At temperatures over 70° C., Loss modulus is decreasing and the material loses its elastic strength and starts to behave like a viscous liquid.

The same phenomenon can be seen in Table 6 where elongation at brake and stress at brake values alongside Young's moduli are presented in different temperatures.

This phenomenon gives material unique properties when considering deformation of composite material in certain temperatures. As elongation at brake values holds its values (instrumental limit) from 60° C. to almost 100° C., stress at brake values alongside with oscillation measurement shows that when temperature is increased over 70° C. liquid like properties of material are dominant and properties of controlled deformation decreases significantly. At 140° C. solid properties of material are decreased so low alongside with stress at brake values that the effect of gravity is significant and reliable detection of properties cannot be done.

TABLE 6

Deformation properties of the present materials at different temperatures

| Temperature (°C) | Elongation at break (%) | Stress at brake (MPa) | Young's modulus, E (MPa) |
|---|---|---|---|
| 23 | 9.7 | 16.0 | 988 |
| 40 | 17.0 | 13.3 | 996 |
| 50 | 52.2 | 9.6 | 599 |
| 60 | 329.4 | 7.7 | 131 |
| 65 | 342.7 | 6.6 | 76 |
| 70 | 344.9 | 5.0 | 10 |
| 80 | 356.6 | 3.6 | 7 |
| 90 | 341.7 | 2.4 | 6 |
| 100 | 316.4 | 1.3 | 5 |
| 140 | ~6.4 | ~0.8 | N/A |

Marine Degradation

The present composites were subjected to further marine degradation tests, the results of which are shown in Table 7:

TABLE 7

Marine degradation

| Test series | TOC (%) | Net $CO_2$ (mg) | Biodegradation (%) AVG | SD | REL |
|---|---|---|---|---|---|
| Cellulose | 42.7 | 73.5 | 78.2 | 3.1 | 100.0 |
| Sulapac ® Straw | 53.2 | 46.7 | 39.9 | 0.7 | 51.0 |

Figure 15:
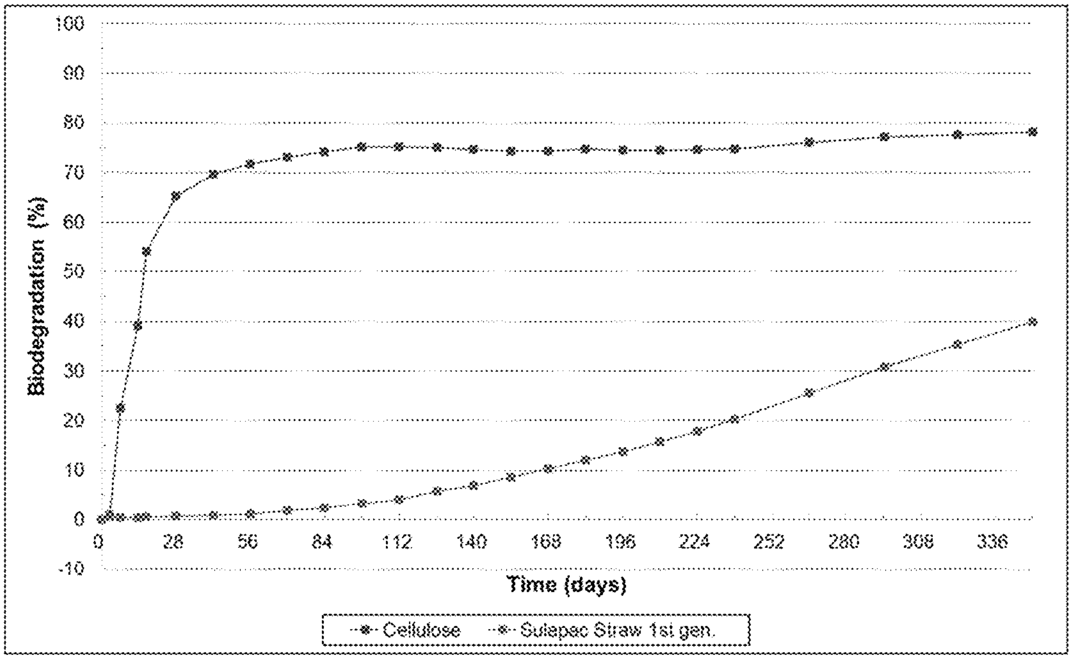
FIG. 15 is a graphical depiction of the evolution of the biodegradation (in percentages) as a function of time for reference and test items ("Sulapac® Straw"), respectively, based on $CO_2$ production.

The results are also depicted graphically in FIG. 15 which shows marine degradation for two items over a period of 350 days, as measured by $CO_2$ production pursuant to ASTM D7081.

As will appear from the figure, the reference item consisting of cellulose reached a biodegradation percentage of 78.2% during the test period. The biodegradation of test item "Sulapac® Straw" also exhibited biodegradation increasing slowly but reaching a level of about 40% (39.9%) at the end of the 350 days period.

In a second series of tests, biodegradation of neat PLA (polylactide) and of wood was compared over a period of 210 days pursuant to ASTM D7081. The results are shown in Table 8.

TABLE 8

Marine degradation

| Test series | TOC (%) | Net $CO_2$ (mg) | Biodegradation (%) AVG | SD | REL |
|---|---|---|---|---|---|
| Cellulose (reference) | 42.7 | 83.1 | 88.5 | 5.7 | 100.0 |
| PLA (reference) | 51.5 | 16.9 | 14.9 | 5.7 | 16.8 |
| Wood (reference) | 48.6 | 13.2 | 12.3 | 1.5 | 13.9 |
| Sulapac ® Straw | 52.9 | 38.1 | 32.7 | 4.4 | 37.0 |

As will appear, PLA exhibits degradation of 16.9 mg and wood of 13.2 mg, whereas the present composite exhibits degradation of 38.1 mg or more. This indicates that the combination degrades faster than its components separately.

CITATION LIST

Patent Literature

WO 2015/048589A1
CN 101712804A
US2013253112A
US2016076014A
US2002130439A
EP 0 319 589
CN 107932874A
JP 4699568B2
U.S. Pat. No. 10,071,528B2
CN 101429328A
US20030216492A
U.S. Pat. No. 6,168,857B1

The invention claimed is:

1. A composite material, comprising:

a first component formed by a renewable polymer and a second component formed by a reinforcing material, wherein said first component comprises a thermoplastic polymer selected from the group consisting of biodegradable polyesters and mixtures thereof, wherein the biodegradable polyester comprises polylactic acid, said second component comprises particles of a hydrophilic material comprising a sieved size of less than 0.5 mm, said composite material further comprising:

a third component formed by a polymer different from the polymer of the first component, said polymer of the third component being capable of forming regions of elasticity to provide for objects having properties of flexibility or semi-rigidity in at least one dimension, wherein the composite material is capable of being extruded into a three-dimensional tubular object having a wall thickness equal to or less than 0.5 mm, wherein the composite material comprises 30 to 70 parts by weight of the first component; 10-20 parts by weight of the second component; 10 to 40 parts by weight of the third component; 0.1 to 3 parts by weight of processing additives;

wherein the third component is formed of polybutylene adipate terephthalate, PBAT, wherein the composite material consists of biodegradable components, and wherein the composite material is configured such that the particles of the hydrophilic material swell inside the composite material upon absorption of water by an amount of swelling that is sufficient to cause cracks to form in the composite material, wherein the cracks accelerate degradation of the composite material, and wherein compounding of the first component, the second component, and the third component into granules before extrusion is carried out at a temperature in the range of 110 to 210° C.

2. The composite material according to claim 1, wherein the third component is configured to form the properties of flexibility or semi-rigidity at ambient temperature.

3. The composite material according to claim 2, wherein the third component is formed by a thermoplastic elastomer having an elongation at break of 50% or more according to ISO 527.

4. The composite material according to claim 1, wherein the biodegradable polyester is a renewable plant-based material that can be replenished within a period of 10 years or less.

5. The composite material according to claim 1, further comprising a fourth component, wherein the fourth component is formed by a natural water soluble material having a water solubility level of more than 100 $g/dm^3$.

6. The composite material according to claim 1, further comprising 5 to 40% by weight of lignocellulosic particles.

7. The composite material according to claim 1, exhibiting—when shaped into a tubular object having a weight of 1.2 g and having an outer surface of 34 $cm^2$—a water absorption of 0.01 $mg/cm^2$ per day and more than 0.1 $mg/cm^2$ within a 30 day period of time at NTP.

8. The composite material according to claim 1, having a surface roughness of more than 1 μm as determined by ISO 4287.

9. The composite material according to claim 1, wherein the particles of a hydrophilic material are obtained by crushing, chipping, shaving, grinding or refining of natural materials having a screened size of less than 0.5 mm.

10. The composite material according to claim 1, capable of being shaped by pull extrusion into an article having at least one wall which has a total thickness of less than 0.5 mm and more than 0.2 mm.

11. The composite material according to claim 1, wherein the processing additives are selected from the group of metal stearates, said processing additives being included in an amount of up to 10 wt %.

12. The composite material according to claim 1, further comprising particles of a finely divided dye material capable of conferring properties of color to the composite material.

13. The composite material according to claim 1, comprising, consisting of or consisting essentially of about 40 to 70 parts by weight of polylactic acid, 10 to 20 parts by weight of wood particles having a screened size of less than 0.5 mm or wood fibers, 10 to 30 parts by weight of PBAT and 0 parts or up to 1 part by weight of wax.

14. The composite material according to claim 1, wherein the processing additives comprise one or more additives selected from the group of oleic acid amides, waxes, metal stearates, mineral fillers and lignin.

15. The composite material according to claim 1,
wherein the particles of a hydrophilic material comprise pre-dried particles of a hydrophilic material comprising a moisture content below 2%; and
wherein the pre-dried particles of a hydrophilic material have not been subjected to any chemical or physical treatment that would permanently reduce or eliminate a capability of the pre-dried particles of a hydrophilic material of taking up moisture and water.

16. The composite material according to claim 1,
wherein the particles of a hydrophilic material comprise pre-dried particles of a hydrophilic material comprising moisture content below 2%; and
wherein at least the sieved size of the pre-dried particles of a hydrophilic material, the parts by weight of the pre-dried particles of a hydrophilic material, and a thickness of the composite material are configured to ensure the degradation is at least 25% after 300 days as measured according to ASTM D7081.

17. The composite material according to claim 1, wherein the compounding is carried out at a temperature in the range of 150 to 210° C.

18. The composite material according to claim 1,
wherein the composite material is formed as a straw.

19. The composite material according to claim 1,
consisting of the polylactic acid, the second component, PBAT, and the processing aid additives.

20. A composite material, comprising:
a first component formed by a renewable polymer and a second component formed by a reinforcing material, wherein
said first component comprises a thermoplastic polymer selected from the group consisting of biodegradable polyesters
said second component comprises wood particles comprising a sieved size of less than 0.5 mm,
said composite material further comprising:
a third component formed by a polymer different from the polymer of the first component, said polymer of the third component being capable of forming regions of elasticity to provide for objects having properties of flexibility or semi-rigidity in at least one dimension,
wherein the composite material is capable of being pull extruded into a three-dimensional tubular object having a wall thickness equal to or less than 0.5 mm,
wherein the composite material comprises 30 to 70 parts by weight of the first component; 10-20 parts by weight of the second component; 10 to 40 parts by weight of the third component; 0.1 to 3 parts by weight of processing additives;
wherein the third component is formed of polybutylene adipate terephthalate, PBAT, and
wherein the composite material consists of biodegradable components.

* * * * *